United States Patent
Lin et al.

(10) Patent No.: US 7,022,299 B2
(45) Date of Patent: Apr. 4, 2006

(54) EXFOLIATIVE CLAY AND DERIVATIVE THEREOF AND METHOD FOR PRODUCING THE SAME

(75) Inventors: Jiang-Jen Lin, Taichung (TW);
Chin-Cheng Chou, Taichung (TW);
Tzong-Yuan Juang, Taichung (TW)

(73) Assignee: National Chung-Hsing University, Taichung (TW)

( * ) Notice: Subject to any disclaimer, the term of this patent is extended or adjusted under 35 U.S.C. 154(b) by 490 days.

(21) Appl. No.: 10/270,209

(22) Filed: Oct. 15, 2002

(65) Prior Publication Data

US 2004/0071622 A1    Apr. 15, 2004

(51) Int. Cl.
*C01B 33/12*    (2006.01)

(52) U.S. Cl. .................. 423/335; 523/216; 524/445; 524/446; 524/449

(58) Field of Classification Search .............. 423/335; 502/62, 80; 523/216; 524/445, 446, 449
See application file for complete search history.

(56) References Cited

U.S. PATENT DOCUMENTS

| | | | |
|---|---|---|---|
| 4,559,218 A * | 12/1985 | Flemmert | 423/336 |
| 5,770,022 A * | 6/1998 | Chang et al. | 204/164 |
| 5,962,132 A * | 10/1999 | Chang et al. | 428/402 |
| 5,980,849 A * | 11/1999 | Ogata et al. | 423/332 |
| 6,822,019 B1 * | 11/2004 | Lin et al. | 523/216 |
| 2004/0069188 A1 * | 4/2004 | Lin et al. | 106/486 |

* cited by examiner

*Primary Examiner*—Christina Johnson
(74) *Attorney, Agent, or Firm*—Charles E. Baxley

(57) ABSTRACT

The present invention discloses an exfoliative clay and a derivative thereof and a method for producing the same. The exfoliative clay is formed by emulsion exfoliating an inorganic layered silicate clay with an amphibious intercalating agent by powerfully stirring at 60–180° C. and not less than 14.7 psig. The amphibious intercalating agent is obtained by copolymerizing polyoxyalkylene amine having molecular weight over 1,800 and polypropylene-grafting-maleic anhydride (PP-g-MA). Before emulsion exfoliation, the intercalating agent is acidified with an inorganic acid. The acidification is the key step for obtaining nanoscale of emulsifying particles less than 100 nm for the exfoliation. The exfoliative clay can be further extracted with a hydroxide or a chloride of alkali metal or alkaline-earth metal to obtain a derivative in the form of nanosilica plates which is free of organic portions.

20 Claims, 2 Drawing Sheets

Scheme A

EXFOLIATIVE CLAY AND DERIVATIVE THEREOF AND METHOD FOR PRODUCING THE SAME

BACKGROUND OF THE INVENTION

1. Field of the Invention

The present invention relates to an exfoliative clay and a derivative thereof and, more particularly, to an exfoliative clay and a derivative thereof which are intercalated and exfoliated with a copolymer of polyoxyalkylene amine and polypropylene-grafting-maleic anhydride (PP-g-MA). The present invention also relates to a method for producing the exfoliative clay and the derivative thereof. In such a process, the intercalating copolymer can be recycled and delaminated silicate plates are obtained.

2. Description of the Related Technology

Currently, inorganic/organic-polymer composite nanomaterials are one of the most significant materials, and thus have been widely investigated and developed. Such composite nanomaterials are dual-phased wherein at least one phase is dispersed under a nanoscale regime. In order to obtain good dispersion, compatibility of the two phases, for example, clay and polymers, is always essentially important.

For the layered hydrophilic silicate clay, the interspaces or interlayer distances can be enlarged and become looser or more compatible after intercalated with an intercalating agent, and thus monomers or polymers are allowed to enter therethrough. The monomers or polymers can be further polymerized or copolymerized to obtain an exfoliative inorganic/organic-polymer composite material. The inorganic silicate clay is generally existed in the organic polymers at approximately 1–5 w %.

Conventional intercalating agents such as 12-aminolauric acid, hexadecylamine, fatty amine, bis(2-hydroxyethyl) methyl tallow alkyl amine and stearylamine, usually have low molecular weights, and consequently the enlarged interlayer distance of the clay is limited.

Referring to the research of T. J. Pinnavaia (Michigan State University), montmorillonite (MMT) is intercalated with an intercalating agent $CH_3(CH_2)_n$—$NH_3^+$, and then exfoliated with diglycidyl ether of BPA (epoxy resin Shell Epon828) to form an epoxy/clay composite nanomaterial through self polymerization of the epoxy resin at 75° C. The structure of the intercalating agent may be monolayer, bilayer, or pseudo-trimolayer, and therefore the interlayer distance of the clay can be enlarged to 13.8–18.0 Å, which allow the epoxy resins to polymerize therein. The exfoliated nanomaterial is 34.1 Å in size and has an improved heat distortion temperature.

Japanese Patent No. 8-22946 discloses the first commercial inorganic/organic-polymer composite nanomaterial, which is developed by Toyota company. This composite material is produced by dispersing $[H_3N^+(CH_2)_{11}COO^-]$/MMT in Nylon 6, wherein the aminocarboxylic acid is provided as an intercalating agent and the polymers are formed between layers of the clay through condensation of caprolactam monomers. However, the aminocarboxylic acid doesn't facilitate apolar polymers such as polyethylene and polypropylene, to uniformly disperse in the hydrophilic layered silicate. To solve this problem, Japanese Patent Publication No. 8-53572 provides organic onium ions as an intercalating agent, which can be uniformly dispersed in molten polyolefin resins. Unfortunately, though the organic onium ions can enlarge the interlayer distances, affinity between the intercalating agent and the polyolefin resin is not enough to exfoliate the layered silicate. Further, Japanese Patent Publication No. 10-182892 indicates that when blending with a molten mixture containing polyolefin resin and olefin oligomers having H-bond, the organized layered silicate might be indefinitely exfoliated due to the strong affinity therebetween. However, it's a dilemma whether to increase the oligomers for better dispersing or to decrease the oligomers for better mechanical characteristics.

Accordingly, there is a need to ameliorate the composite materials by means of providing appropriate intercalating agents, whereby the modified clay can exhibit good interfacial and compatible effect.

SUMMARY OF THE INVENTION

An object of the present invention is to provide an exfoliative clay, which is stable and has excellent affinity to both inorganic and organic matters.

Another object of the present invention is to provide a derivative of the exfoliative clay, which is in the form of plates in association with organic copolymers and has excellent affinity or compatibility to both inorganic and organic matters.

A further object of the present invention is to provide a method for producing the exfoliative clay and the derivative thereof.

In order to achieve the above object, the exfoliative clay of the present invention primarily requires an amphibious intercalating agent formed by copolymerizing polyoxyalkylene amine having molecular weight over 1,800 and polypropylene-grafting-maleic anhydride (PP-g-MA); and an inorganic layered silicate clay emulsion exfoliated with said amphibious intercalating agent. In the process, the exfoliation can be achieve in one-step and the intercalating agent can be further recycled for second time exfolaition.

The aforementioned polyoxyalkylene amine can be polyoxyalkylene diamine, and preferably polyoxypropylene diamine, polyoxyethylene diamine and poly(oxyethyleneoxypropylene) diamine adduct.

The inorganic layered silicate clay is not restricted, for example, montmorillonite, kaolin, mica and talc. The clay preferably has a cation exchange capacity between 50–200 meq/100 g.

A derivative of the exfoliative clay in the form of a nanosilica plate can be further produced by extracting the exfoliative clay with a hydroxide or a chloride of alkali metal or alkaline-earth metal such as sodium hydroxide, and the intercalating agent could be recycled.

The method for producing the above exfoliative clay primarily includes at least one step of emulsion exfoliating a swelled inorganic layered silicate clay with an acidified amphibious intercalating agent by powerfully stirring at 60–180° C. and not less than 14.7 psig in water. The amphibious intercalating agent can be obtained by a reaction of PP-g-MA and polyoxyalkylene amine having molecular weight over 1,800. Before intercalation, the amphibious intercalating agent is preferably dissolved in an organic solvent and acidified with an inorganic acid in water to form an emulsion of organic solvent/water/intercalating agent at microemulsion particle size.

The organic solvent can be ether, ketone, ester, nitrile, saturated hydrocarbons, chloric saturated hydrocarbons or aromatic hydrocarbons, for example, tetrahydrofuran, isopropyl ether, methyl tert-butyl ether, methyl isobutyl ketone, acetonitrile, ethyl acetate, pentane, hexane, heptane, cyclohexane, dichloromethane, benzene, toluene, dimethylbenzene, chlorobenzene or methoxybenzene.

The inorganic acid can be hydrochloric acid, sulfuric acid, phosphoric acid or nitric acid.

The temperature for emulsion exfoliation is usually at 80–160° C., and preferably at 80–120° C.

The intercalating agent is usually acidified above 25° C., and preferably in the range of 85–100° C., and the acidified amphibious intercalating agent has a particle size ranging from 50 to 500 nm.

The weight ratio of the amphibious intercalating agent to the inorganic layered silicate clay is preferably more than 75/25.

The exfoliative caly of the present invention can be used for reducing interfacial tension of hydrophilic organic matter and hydrophobic ORGANIC matter, or modifying a polymer to improve the mechanical or chemical properties.

The method for producing the nanosilica plate primarily includes steps of: a) dissolving the above exfoliative caly containing the intercalating copolymers in an organic solvent at a predetermined temperature to form an emulsion A; b) dispersing said layered inorganic silicate ($Na^+$-MMT) clay in hot water and powerfully stirring to obtain an emulsion B; c) mixing said emulsion A and said emulsion B by powerfully stirring at a predetermined temperature; d) adding a hydroxide or a chloride of alkali metal or alkaline-earth metal with powerfully stirring; and e) leaving said mixture static for settling and collecting precipitates dispersed in water.

In the method aforementioned, the organic solvent can be the same to that used for producing the exfoliative clay.

DETAILED DESCRIPTION OF THE INVENTION

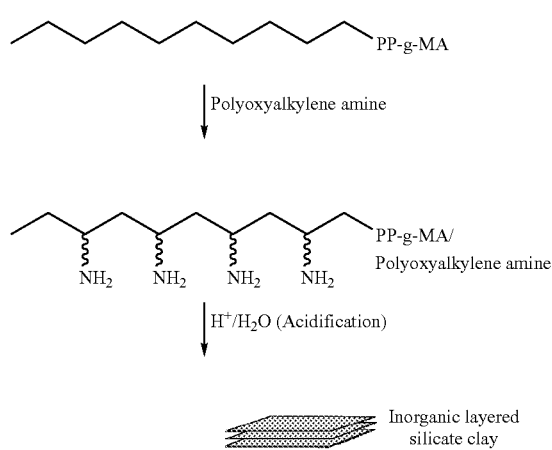

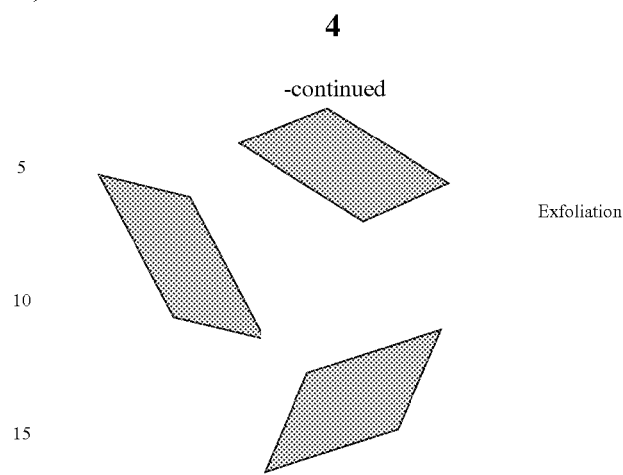

Figure 1:
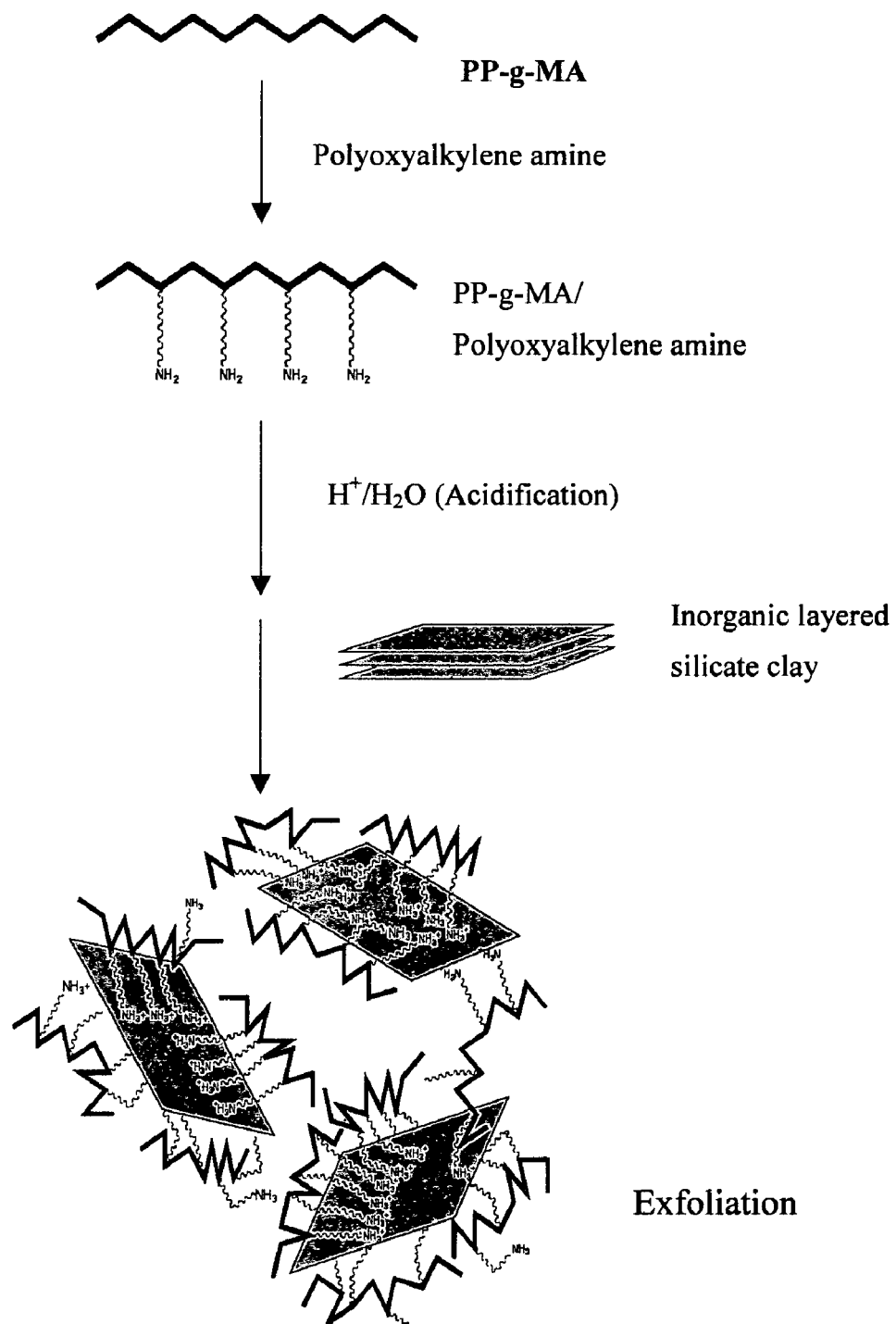
FIG. 1 illustrates a process for producing an exfoliative clay according to the present invention.
Figure 2:
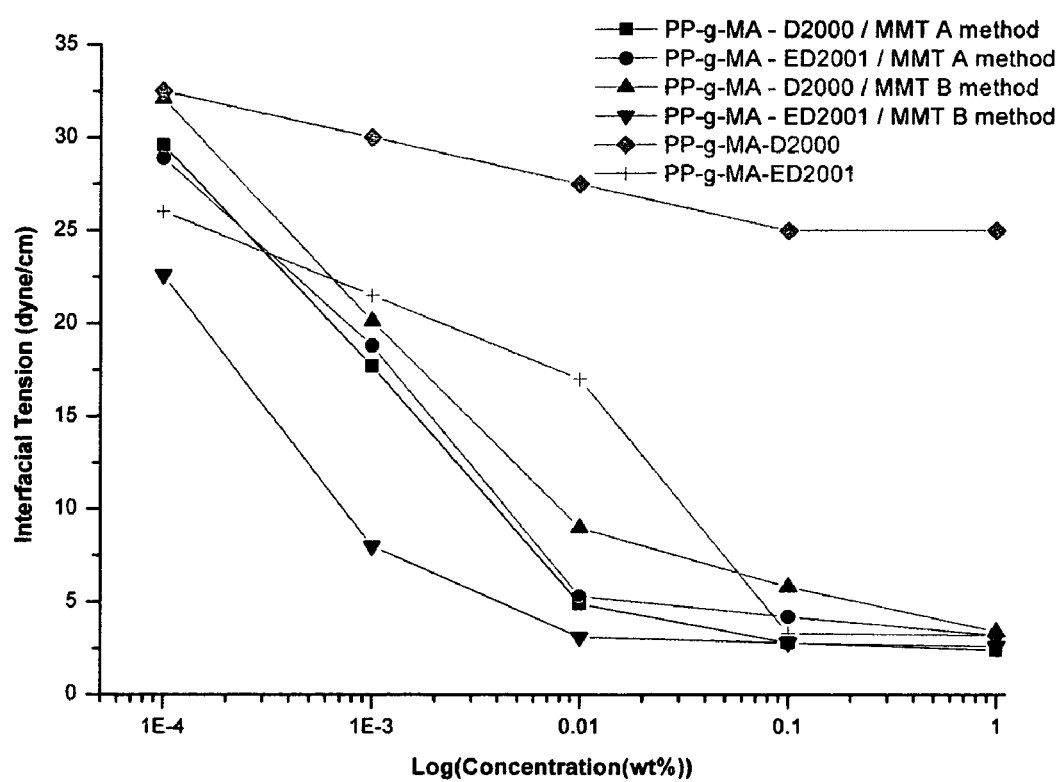
FIG. 2 shows the interfacial tensions of toluene/water mixing with the intercalating agents, the intercalated clay or the exfoliative clay in accordance with the present invention.

In the above scheme, PP-g-MA is provided to copolymerize with polyoxyalkylene amine and thus form a comb-like amphibious polymer, PP-g-MA/Polyoxyalkylene amine. This comb-like structure includes a backbone of apolar polypropylene, and side chains having polar functional groups of polyoxyalkylene ending with an amino group. The polyoxyalkylene can be polyoxyethylene (POE), polyoxypropylene (POP) or the like. The maleic anhydride has high cyclic tension and easily reacts with nucleophilic molecule, so that primary aliphatic amine can react with maleic anhydride at 70° C. to open the cyclic structure and form a structure having functional groups of carboxylic acid (COOH) and amide.

The amphibious polymers, PP-g-MA/polyoxyalkylene amine, is then dissolved in an organic solvent and acidified with an inorganic acid to form an emulsion. Next, the emulsion is mixed with an inorganic layered silicate clay to enlarge interlayer distances thereof or directly exfoliate the clay. To further explain the present invention, some preferred examples are described in detail as the follows.

In these examples, montmorillonite (MMT) is used, which is an alumino-silicate clay, and has a structural formula including two layers of tetrahedral silicate and one layer of octahedral alumina therebetween. In general, the primary structure of the MMT includes average 10 parallel lamellae and is about 100 Å high with interlayer distances about 12 Å. The secondary structure of the MMT is about size 0.1–10μ in diameter and can be formed by aggregating hydrophilic silicate thereof. The clay such as MMT may have cation exchange capacity (CEC) in a wide range, and preferably within 50–200 meq/100 g. Beyond such a range, the clay is difficult to be swelled because of insufficient ion exchange or excessive interlayer attraction. The MMT used in the following examples is Kunipia F ($Na^+$-MMT, CEC=115 meq/100 g).

The PP-g-MA used in the examples is produced by Eastman Co. (Epolene E-43 or MPP-9100), which has weight average Mw=9100 detected with gel permeation chromatography, numerous average Mn=3900, and titration acid value=47 mg KOH/g. The maleic anhydride contained in the PP-g-MA is 4 wt. %, or 3.7 maleic anhydride for each PP-g-MA polymer starin.

The polyoxyalkylene amine used in the examples is commercial product of Huntsman Chemical Co., and include Jeffamine® D-2000, poly(propylene glycol) bis (2-aminopropyl ether), having the following structure,

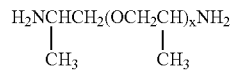

wherein x=33 (Approx. Mw=2000);

and Jeffamine® ED-2001, poly(propylene glycol)-block-poly(ethylene glycol)-block-poly(propylene glycol) bis(2-aminopropyl ether), having the following structure,

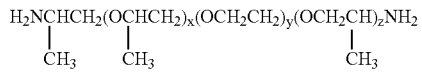

wherein x+z=5, y=39.5 (Approx. Mw=2000).

EXAMPLE 1

Step 1: Swelling the Layered Inorganic Silicate Clay

Montmorillonite Kunipia F (5 g, CEC=15 meq/100 g) is dispersed in water (500 ml) AT 80° C.), and then vigorously stirred for 4 hours to form an earth-colored stable homogenous slurry in water.

Step 2: Synthesizing the Amphibious Intercalating Agent

PP-g-MA (37 g, containing 15 mmole maleic anhydride on polypropylene) is added into toluene and heated to 120° C.; ED-2001 (30 g, 15 mmole) is then added therein to form a gel-like precipitate which is the amphibious intercalating copolymeric agent PP-g-MA/ED-2001. Completion of the reaction can be judged by FTIR analysis for the characteristic amide absorption.

Step 3: Acidifying the Amphibious Intercalating Agent PP-g-MA ED-2001

The amphibious intercalating agent PP-g-MA/D-2001 (13.2 g, containing 5.75 meq of end amino group) is dissolved in toluene, and then equivalent moles of hydrochloric acid (37% in water) is added for acidification at 80° C. for 30 minutes. The acidification converts amine into a quaternary ammonium salt which forms emulsion in toluene/water and appropriate for intercalating.

Step 4: Intercalating the Layered Inorganic Silicate Clay

The acidified emulsion of Step 3 is added into the slurry of Step 1, and then powerfully stirred at 80° C. for 5 hours to perform cation exchange or exfoliating or intercalating process. The resultant mixture is then settled and filtered. The filtered solid is then dried in a vacuum oven at 80° C. for 24 hours to obtain a dried tint-yellow solid exfoliative clay, PP-g-MA/ED2001/MMT.

EXAMPLE 2

Repeat steps of Example 1, but in Step 4, intercalating the layered inorganic silicate clay is carried out at 120° C. in an autoclave reactor and the pressure over 14.7 PSI, and finally obtain an exfoliative clay, PP-g-MA/ED2001/MMT.

EXAMPLE 3

Repeat steps of Example 1 but replace ED2001 with D2000 and finally obtain an exfoliative clay, PP-g-MA/D2000/MMT.

EXAMPLE 4

Repeat steps of Example 2 but replace ED2001 with D2000 and finally obtain an exfoliative clay, PP-g-MA/D2000/MMT.

COMPARATIVE EXAMPLE 1

Repeat steps of Example 1, but use less amount of intercalating agent, that is various ratio of PP-g-MA/ED2001 to MMT is applied as listed in Table 1, and finally obtain an intercalated clay, PP-g-MA/ED2001/MMT. The interlayer distances detected with X-ray diffraction is listed in Table 1.

COMPARATIVE EXAMPLE 2

Repeat steps of Example 2, but use less amount of intercalating agent, that is various ratio of PP-g-MA/D2000 to MMT is applied as listed in Table 1, and finally obtain an intercalated clay, PP-g-MA/D2000/MMT. The interlayer distances detected with X-ray diffraction is listed in Table 1.

COMPARATIVE EXAMPLE 3

Repeat steps of Example 1, but only ED2001 is used for intercalation in a weight ratio as listed in Table 1, and finally obtain an intercalated clay, ED2001/MMT. The interlayer distances detected with X-ray diffraction is listed in Table 1.

COMPARATIVE EXAMPLE 4

Repeat steps of Example 2, but only D2000 is used for intercalation in a weight ratio as listed in Table 1, and finally obtain an intercalated clay, D2000/MMT. The interlayer distances detected with X-ray diffraction is listed in Table 1.

TABLE 1

Comparison of intercalation or exfoliation of clay with PP-g-MA derived copolymers

| | Intercalating agent | Intercalating temperature (° C.) | Organic matter/ clay (w/w %)[a] | Interlayer distance[b] (Å) |
|---|---|---|---|---|
| Example 1 | PP-g-MA/ED2001 | 80 | 85.0/15.0 | Exfoliating |
| Example 2 | PP-g-MA/ED2001 | 120 | 85.3/14.7 | Exfoliating |
| Example 3 | PP-g-MA/D2000 | 80 | 85.2/14.8 | Exfoliating |
| Example 4 | PP-g-MA/D2000 | 120 | 86.4/13.6 | Exfoliating |
| Comparative Example 1 | PP-g-MA/ED2001 | 80 | 74.3/25.7 | 19.9 |
| Comparative Example 2 | PP-g-MA/D2000 | 80 | 75.8/24.2 | 21.6 |
| Comparative Example 3 | ED2001 | 80 | 43.0/57.0 | 19.5 |
| Comparative Example 4 | D2000 | 80 | 63.0/37.0 | 58 |

[a] by thermal gravimetric analysis (TGA)
[b] XRD analysis shows the interlayer distance (d-spacing) for intercalating samples with no orderly Bragg's basal spacing for exfoliating sample.

The exfoliative sample, indicated by XRD analysis, implicates the complete layer delamination or no basal spacing for XRD, while intercalating still exhibits basal spacing or ordered structure of layered MMT. As shown in Table 1, in comparing Examples 1–2 and Comparative Example 1, as well as Examples 3–4 with Comparative Example 2, the intercalating agent must be over the stoichiometric requirement of the MMT CEC to reach the desired exfoliation and TGA also showed the ratios of organic matter to clay in Examples 1–4 are higher than others, and then the exfoliative clay can be obtained at 80° C. and 120° C. That is, the direct exfoliation rather than only intercalation (19.5–58 Å) may depend on the ratio of the organic matter to the clay. In the present invention, the weight ratios less than 74.3/25.7 and higher than 86.4/13.6 respectively result in intercalation and direct exfoliation. The diameters according to laser particle analysis are about 1 μm and 100 nm in toluene for the intercalated clay and the exfoliated clay, respectively.

Further comparison (Comparative Examples 3 and 4) which affords only intercalation implicates the importance of the amphiphilicity of the copolymer with PP-g-MA/ED2001 structure, only ED2001 or D2000 can not exfoliate the MMT clay.

Test of Dispersion

The modified clays of Examples 1–2 and Comparative Examples 1–4 are mixed in toluene, ethanol and water to observe the dispersion states thereof.

TABLE 2

| | Dispersion state in | | |
|---|---|---|---|
| | Toluene | Ethanol | Water |
| Example 1 | + | +− | − |
| Example 2 | + | +− | − |
| Comparative Example 1 | +− | +− | − |
| Comparative Example 2 | +− | +− | − |
| Comparative Example 3 | − | + | + |
| Comparative Example 4 | + | − | − |

+: well dispersing
+−: coagulating after 24 hours
−: coagulating instantly

As shown in Table 2, when the same intercalating agents are applied, the exfoliative clays exhibit similar dispersion state with ethanol as intercalated clays of Comparative Examples 1 and 2. However, the exfoliative clays exhibit better dispersion state with hydrophobic toluene than the intercalated clays of Comparative Examples 1 and 2. As for the modified clay of Comparative Examples 3 and 4, only ethanol or toluene can be compatible therewith, which is not suitable for serving as a surfactant for organic materials.

Test of Interfacial Effect

The modified clays of Examples 1–2 and Comparative Examples 1–2, and the intercalating agents, PP-g-MA/ED2001 and PP-g-MA/D2000, are mixed in a mixture containing toluene and water. The interfacial tensions changing with concentrations are measured and shown in FIG. 1.

FIG. 1 shows that the exfoliative clays, i.e., PP-g-MA/ED2001/MMT of Example 1 in accordance with the present invention, performs superior effect of reducing the interfacial tension between toluene and water to about 7.5 dyne/cm at very low concentration of 10 ppm, and to only 3.8 dyne/cm at 100 ppm. Another exfoliative clay, PP-g-MA/D2000/MMT also exhibits similar surfactant effect as the intercalated clays of Comparative Examples 1 and 2. The intercalating agents, PP-g-MA/ED2001 and PP-g-MA/D2000 can reduce the interfacial tension to a degree, but it's inferior when compared with the above.

Therefore, it can be analogized that polymers such as epoxy resin, polypropylene (PP), polyethylene glycol terephthalate (PET), polystyrene (PS), syndiotactic polystyrene (SPS), polyurethane (PU), Nylon and styrene-acrylnitrile copolymer (SAN), can be easily dispersed in these exfoliative clays under a nanoscale regime to form inorganic/organic composite materials. Furthermore, characteristics of polymers such as resistance to heat distortion, gas barrier properties, rigidity, etc., may be improved by mixing with these polymers to form various kinds of nanomaterials.

EXAMPLES 5–6

Repeat steps of Example 1, but acidification temperature is controlled at 80° C. and various emulsion states are applied as listed in Table 3. Diameters of the emulsified intercalating agent are measured at 25° C. and listed in Table 3.

COMPARATIVE EXAMPLES 5–6

Repeat steps of Example 1, but acidification temperature is controlled at 25° C. and various emulsion states are applied as listed in Table 3. Diameters of the emulsified intercalating agent are measured at 25° C. and listed in Table 3.

TABLE 3

| | Acidification Temperature (° C.) | Emulsion State[a] | Mean Diameter[b] (nm) | Intercalation State[c] |
|---|---|---|---|---|
| Example 5 | 85 | W/O | 256 | Exfoliate |
| Example 6 | 85 | O/W | 72 | Exfoliate |
| Comparative Example 5 | 25 | W/O | 2004 | Intercalate |
| Comparative Example 6 | 25 | O/W | 1185 | Intercalate |

[a]W/O or O/W depending on the toluene/water ratio used in the process
[b]measured by laser particle analyser
[c]measured by x-ray diffractometer showing pattern or none pattern basal spacing As shown in Table 3, regardless of the emulsion state being W/O or O/W, the higher acidification temperature results in the finer particles. The mean diameters of the PP-g-MA/ED2001 intercalating agent are only 72 nm and 256 nm when acidified at 85° C., and consequently direct exfoliation can be achieved. As for the acidification temperature 25° C., the diameters of the intercalating agent are more than 1,000 nm. That is, the exfoliate clay can only be achieved by emulsifying the intercalating agent at very fine particle. The larger particle of emulsification results in only the intercalating clay.

Producing the Nanosilica Plates by a Second Step Exchangin/Recycling Reaction

The derivative of the exfoliative clay in accordance with the present invention can be produced by steps of:

a) dissolving the exfoliative caly (2 g) obtained from one of Examples 1–4 in toluene (100 ml, 110° C.) at a predetermined temperature to form an emulsion A;

b) dispersing the Na$^+$-MMT (5 g) in hot water (600 ml, 80° C.) and powerfully stirring to obtain an emulsion B;

c) mixing the emulsion A and the emulsion B by powerfully stirring at 80° C. for 30 minutes;

d) adding sodium hydroxide (5N, 600 ml) with powerfully stirring at 80° C. for 3 hours; and e) leaving the mixture static for settling and then collecting precipitates dispersed in lower water.

Na$^+$-MMT exfoliation can be caused by the emulsion B obtained in the step (c). The extracted and collected precipitates are the nanosilica plates, and the upper liquid is an organic solution containing the intercalating agent, which can be recycled for reusing. Yield of the "pure" nanosilicate plate obtained according to the above procedure can reach more than 90 wt. %. The conventional nanomaterial is usually spherical, filmy or cylindrical, however, the derivative of the exfoliative clay produced in accordance with the present invention has high aspect ratio and is plate-shaped in a dimension of approximately 100×100×1 nm.

What is claimed is:

1. An exfoliative clay, comprising:
   an amphibious intercalating agent formed by copolymerizing polyoxyalkylene amine having molecular weight over 1,800 and polypropylene-grafting-maleic anhydride (PP-g-MA); and an inorganic layered silicate clay emulsion exfoliated with said amphibious intercalating agent.

2. The exfoliative clay of claim 1, wherein said polyoxyalkylene amine is selected from a group consisting of polyoxypropylene diamine, polyoxy ethylene diamine and poly(oxyethylene-oxypropylene) diamine adduct.

3. The exfoliative clay of claim 1, wherein said inorganic layered silicate clay is selected from the group consisting of montmorillonite, kaolin, mica and talc.

4. The exfoliative clay of claim 1, wherein said inorganic layered silicate clay has a cation exchange capacity between 50–200 meq/100 g.

5. The exfoliative clay of claim 1, wherein said amphibious intercalating agent and said inorganic layered silicate clay has a weight ratio more than 75/25.

6. A method for producing an exfoliative clay, comprising at least one step of emulsion exfoliating a swelled inorganic layered silicate clay with an acidified amphibious intercalating agent by powerfully stirring at 60–180° C. and not less than 14.7 psig in water; wherein said amphibious intercalating agent is obtained by copolymerizing polyoxyalkylene amine having molecular weight over 1,800 and polypropylene-grafting-maleic anhydride (PP-g-MA), and is dissolved in an organic solvent and acidified with an inorganic acid to form an emulsion.

7. The method of claim 6, wherein said organic solvent is selected from the group consisting of ether, ketone, ester, nitrile, saturated hydrocarbons, chloric saturated hydrocarbons or aromatic hydrocarbons.

8. The method of claim 6, wherein said organic solvent is selected from the group consisting of tetrahydrofuran, isopropyl ether, methyl tert-butyl ether, methyl isobutyl ketone, ethylnitrile, ethyl acetate, pentane, hexane, heptane, cyclohexane, dichloromethane, benzene, toluene, dimethylbenzene, chlorobenzene and methoxybenzene.

9. The method of claim 6, wherein said clay is selected from the group consisting of montmorillonite, kaolin, mica and talc.

10. The method of claim 6, wherein said polyoxyalkylene amine is selected from a group consisting of polyoxypropylene diamine, polyoxy-ethylene diamine and poly(oxyethylene-oxypropylene) diamine adduct.

11. The method of claim 6, wherein said inorganic acid is selected from a group consisting of hydrochloric acid, sulfuric acid, phosphoric acid and nitric acid.

12. The method of claim 6, wherein said step of emulsion exfoliating a swelled inorganic layered silicate clay is carried out at 80–160° C.

13. The method of claim 6, wherein said step of emulsion exfoliating a swelled inorganic layered silicate clay is carried out at 80–120° C.

14. The method of claim 6, wherein said intercalating agent is acidified above 25° C.

15. The method of claim 6, wherein said intercalating agent is acidified at 85–100° C.

16. The method of claim 6, wherein said amphibious intercalating agent and said inorganic layered silicate clay has a weight ratio more than 75/25.

17. The method of claim 6, wherein said acidified amphibious intercalating agent has a particle size ranging from 50 to 500 nm.

18. A method for producing a nanosilica plate, comprising steps of:
   a) dissolving the exfoliative clay obtained in claim 6 in an organic solvent at a predetermined temperature to form an emulsion A;
   b) dispersing said layered inorganic silicate clay in hot water and powerfully stirring to obtain an emulsion B;
   c) mixing said emulsion A and said emulsion B by powerfully stirring at a predetermined temperature;
   d) adding a hydroxide or a chloride of alkali metal or alkaline-earth metal with powerfully stirring; and
   e) leaving said mixture static for settling and collecting precipitates dispersed in water.

19. The method of claim 18 wherein said organic solvent is selected from the group consisting of ether, ketone, ester, nitrite, saturated hydrocarbon, chloric saturated hydrocarbon and aromatic hydrocarbon.

20. The method of claim 18, wherein said hydroxide of alkali metal is sodium hydroxide.

* * * * *